March 10, 1959   D. A. WALKER ET AL   2,876,612
COTTON PICKER SPINDLE SHIELD STRUCTURE
Filed April 27, 1956
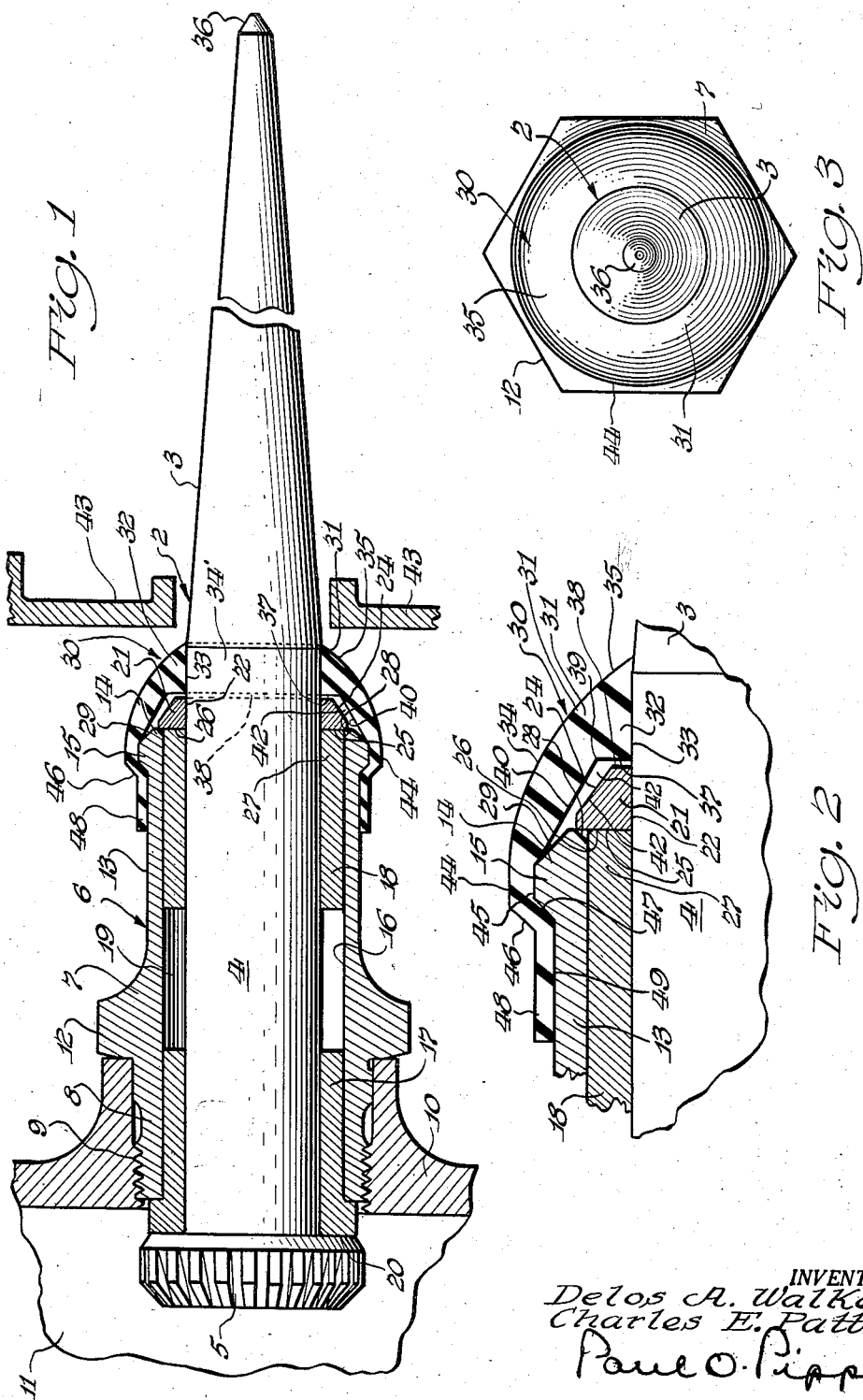
INVENTORS
Delos A. Walker
Charles E. Patton
Paul O. Pippel
Attorney

United States Patent Office 2,876,612
Patented Mar. 10, 1959

2,876,612

COTTON PICKER SPINDLE SHIELD STRUCTURE

Delos A. Walker and Charles E. Patton, Memphis, Tenn., assignors to International Harvester Company, a corporation of New Jersey Application April 27, 1956, Serial No. 581,128

8 Claims. (Cl. 56—50)

This invention relates to cotton pickers of the type incorporating a plurality of spindles which are carried by a support structure normally termed a drum wherein the spindles are sequentially entered and withdrawn from a plant attendant to the machine being moved along a row of cotton plants and wherein the spindles rotate on their individual axes in order to extract the lint from the plants and more particularly the invention is directed to a shield structure interposed between the spindle and the support therefor for preventing accumulations of lint on the support.

It has been found in current practice on machines in the field that cotton lint wraps around the spindle holders and accumulates in big wads which are normally termed twists in the trade in that the cotton is so twisted that it is difficult to process. Furthermore, these accumulations become very badly stained with oil seepage from the bearings that support the spindles and the dirty and oily lint cotton drops off into the clean cotton and contaminate it so that there are serious objections by the buyers with resultant refusal to purchase or downgrading of the cotton to such an extent that the producer suffers tremendous losses.

A general object of the invention is to provide a novel shield structure which inhibits the accumulation of "wind-ons" about the spindle holders and which is adaptable for application to machines currently in use without expensive replacement of parts.

A further object of the invention is to provide a novel cup-shaped shield formed of elastomer material such as rubber or equivalent synthetics which is of resilient character and which has a shielding portion so designed as to prevent cotton readily wrapping thereabout and which has a stretchable portion adapted to releasably hold the shield on the spindle holder.

These and other objects of the invention will become more apparent from the specification and the drawing wherein:

Figure 1 is a central longitudinal vertical sectional view through the spindle support structure and holder assembly, the spindle being broken apart and shown in elevation;

Figure 2 is an enlarged fragmentary view of a portion of the shield structure and associated assembly shown in Figure 1, and Figure 3 is an outer end view of the structure shown in Figure 1.

Describing the invention in detail and having particular reference to the drawings, there is shown a spindle generally designated 2 which comprises a tapered picker portion 3 at its outer end and an inner shank or journal portion 4 of generally cylindrical form which terminates at its inner extremity in a beveled gear 5 which is adapted to cooperate with a companion bevel gear for rotating the spindle about its longitudinal axis as will be readily understood by those skilled in the art and as best shown in U. S. Patent 2,140,631.

The shank portion 4 is mounted within a tubular holder assembly or support generally designated 6 which comprises a nut structure 7 including an inner end threaded portion 8 which is threaded as at 9 within a hub 10 on a bar 11 of a drum assembly such as explained in the beforementioned patent. The nut 7 has an intermediate wrech-engaging hexagonal portion 12 and an outer tubular preferably cylindrical portion or cylindrical surface means 13 which about its outer extremity 14 is provided with a peripheral bead 15. The nut 7 is provided with a bore 16 which receives the bearing means comprising inner and outer cylindrical bearing members 17 and 18 which are preferably press-fitted within the bore and spaced apart to define a lubricant chamber 19 therebetween, the inner bearing member 17 being abuttable as at 20 with the bevel gear 5 whereby the spindle is prevented from moving outwardly and the spindle is prevented from moving inwardly by means of a collar or an abutment member 21 which is sleeved over the outer end of the shank portion 4 of the spindle and press-fitted thereon as at 22. Thus an internal bearing surface is provided in the holder. The collar or ring or guard 21 has a forwardly facing conical surface 24 and a rear radially extending surface 25 which is abuttable as at 26 with the adjacent end or outer extremity 27 of the outer bearing member 18.

It will be seen that the outer end portion 14 is provided with a chamfer 28 at the outer end of the bore 16 in order to accommodate ready insertion of the bearing member 18 and that the said end portion 14 is also provided with an external chamfer 29 which leads into the bead 15 for a purpose presently to be described.

The feature of the present invention is the provision of a shield or sealing ring generally designated 30 which is formed of elastomer material such as rubber or a synthetic comparable material of a resilient or yielding nature. The shield comprises a bulbous nose portion 31 which is constituted of a central portion 32 of relatively thick depth axially of the spindle 2 and the central portion having a central axial aperture 33 through which the outer end portion with cylindrical surface means 34' of the spindle shank extends and has a sliding fit therewith. Thus it will be understood that the shank portion 4 rotates relative to the shield and yet the opening 33 is made of such diameter that there is a close fit of the shield to the shank so that there is a snug confinement to retard the entry of dirt between the shank 4 and the periphery of the bore 33. The central portion 32 merges about its outer periphery into the narrow end of a generally frusto-conical side web portion 34 which cups and encloses the collar 21. The annular web 34 together with the central portion present an outwardly facing convex surface 35 which focuses or faces toward the tip end 36 of the spindle and provides a smooth surface which presents minimum opportunity for cotton lint to wrap on. It will be observed that the central portion 32 is provided with a substantially radial inner side 37 which is spaced outwardly of the opposed end 38 of the collar 21. The outer edge 39 of the surface 37 merges into the narrow end of a conical internal surface 40 on the inner side of the web portion 34 and the surfaces 37 and 40 are spaced outwardly with respect to the conical periphery 24 of the collar 21 and with respect to the chamfer 29 on the bead 15 in order to provide a flexing space 42 which permits the side wall of the nose portion of the shield to flex whereby if any cotton does adhere to the nose portion and starts to build up the cotton will be compressed between the wall 34 and the slats 43 between which the spindles 2 operate as explained in the beforementioned patent so that the web portion 34 is flexed and tends to work the cotton off onto the revolving spindle portion 3 so that the cotton can be thrown off.

The outer periphery of the web portion 34 is therefore relatively thin radially with respect to the portion adjacent to the central part 32 which enhances the flexibility of the peripheral portion 44 so that it may be easily distorted and slipped over the outer periphery 45 of the bead portion 15 which it engages substantially complementally. The inner extremity of the side web 34, that is the broad end of the frustum merges into the introverted annular flange portion 46 which engages against the back side 47 of the bead 15 for positive retention of the shield 30 on the assembly 6. The flange portion 46 merges into a ring-like or tubular retainer portion 48 which extends inwardly along the portion 13 of the nut member and embraces the same tightly along the periphery thereof as at 49, the portion 48 being stretched to fit over the part 13 with a tensile grip thereon.

Thus it will be seen that the novel shield is not only an inexpensive part but also has a cotton shedding portion of novel construction and a releasable retaining portion and that it functions not only to inhibit accumulations of cotton on the support structure but in preventing dirt working into the bearing structure.

What is claimed is:

1. A cotton picker spindle assembly comprising: a tubular support having an outer portion with an external bead thereabout and having a bore with a bearing surface therein, a rotatable cotton picker spindle having a shank portion journalled in said opening, a collar sleeved on said spindle and in abutment with said support and of lesser diameter than said support, and a shield of elastomer material comprising a central bulbous nose portion having a central bore admitting said spindle therethrough and positioned in front of said collar and presenting a convex outer surface facing toward the picking portion of the spindle, said nose portion being hollow and having a peripheral web extending toward the support and enclosing said collar and said bead and further having an introverted annular flange extending behind said bead for retaining said shield on the support and a tubular portion integral with said flange and extending inwardly therefrom and tightly embracing said outer portion of said support.

2. A cotton picker spindle assembly comprising a tubular holder, a cotton picker spindle having an inner portion journalled in said assembly and having an outer picker portion, a guard connected to the spindle and bearing against the outer extremity of said holder, and a shield of cuplike construction formed of elastomer material and including a central portion with an opening snugly receiving said spindle and having a sliding fit therewith whereby the spindle rotates with respect to said shield, said shield having an annular web about said central portion cupping said collar and the adjacent end of said holder, and a sleeve portion integral with said web and tightly sleeved over a contiguous portion of said assembly with a stretch fit thereon for releasably holding said shield on said assembly.

3. The invention according to claim 2 and said assembly comprising an external circumferential bead, and said shield having an introverted portion between said web and said sleeve portion thereof seated behind said bead.

4. The invention according to claim 2 and said center portion and said web presenting a convex external cotton-shedding surface focused toward the picker portion of the spindle.

5. A cotton picker spindle assembly comprising: a spindle support having a spindle receiving opening with an inner bearing surface and outer cylindrical surface means at one end thereof; a rotatable spindle having its axis of rotation coincident with that of the bearing surface and having a shank portion journalled in the opening and a picking portion extending axially outwardly from the aforesaid end of the support; cylindrical surface means on said shank portion rotatable therewith, said cylindrical surface means on the shank portion being unequal in its periphery to said cylindrical surface means of the support; an elastic sealing ring mounted over both of said cylindrical surface means, the elastic qualities of the ring causing the cylindrical surface means with the larger periphery to be gripped with the greater pressure thereby resulting in relative rotation between the other surface means and the ring upon rotation of the spindle while maintaining sealing contact between the ring and said other cylindrical surface means.

6. The invention according to claim 5, in which the support has a radial portion extending from its cylindrical surface means and the spindle assembly is further characterized by having said elastic ring contiguously abutting said portion.

7. The invention according to claim 5, in which said cylindrical surface means of the support is larger than that of the cylindrical surface means on said shank portion thereby causing said ring to be held against rotation with respect to the support.

8. A cotton picker spindle assembly comprising: a spindle support having a spindle receiving opening with an inner bearing surface and outer cylindrical surface means; a rotatable spindle having its axis of rotation coincident with that of the bearing surface and having a shank portion journalled in the opening and a picking portion extending axially outwardly from the end of the support; cylindrical surface means on said shank portion constrained for rotation therewith; an annular elastic seal mounted over the said outer surface means of the holder and said cylindrical surface means on the shank portion, the elastic qualities of the seal causing one of the surface means to be gripper with a greater pressure than the other of said surface means thereby resulting in relative rotation between the other surface means and the seal upon rotation of the spindle while maintaining sealing contact between the seal and the other surface means.

References Cited in the file of this patent

UNITED STATES PATENTS

| | | |
|---|---|---|
| 2,105,777 | Smith | Jan. 18, 1938 |
| 2,497,776 | Kallgren | Feb. 14, 1950 |
| 2,669,828 | Hutchins | Feb. 23, 1954 |
| 2,743,569 | Barbknecht et al. | May 1, 1956 |